(12) United States Patent
Takai

(10) Patent No.: US 8,043,761 B2
(45) Date of Patent: Oct. 25, 2011

(54) COMPACT FUEL CELL SEPARATOR INCORPORATING FLUID OXIDANT SUPPLY MEANS, A FUEL CELL DEVICE AND AN ELECTRONIC APPLIED DEVICE INCORPORATING THE COMPACT FUEL CELL SEPARATOR

(75) Inventor: Yuichi Takai, Tokyo (JP)

(73) Assignee: Sony Corporation, Tokyo (JP)

( * ) Notice: Subject to any disclaimer, the term of this patent is extended or adjusted under 35 U.S.C. 154(b) by 965 days.

(21) Appl. No.: 10/539,243

(22) PCT Filed: Dec. 19, 2003

(86) PCT No.: PCT/JP03/16340
§ 371 (c)(1),
(2), (4) Date: Jul. 29, 2005

(87) PCT Pub. No.: WO2004/064183
PCT Pub. Date: Jul. 29, 2004

(65) Prior Publication Data
US 2005/0266295 A1   Dec. 1, 2005

(30) Foreign Application Priority Data
Jan. 8, 2003 (JP) ................ P2003-001964

(51) Int. Cl.
*H01M 8/04* (2006.01)
*H01M 2/14* (2006.01)
(52) U.S. Cl. ........ 429/457; 429/433; 429/443; 429/444; 429/448; 429/512; 429/513; 429/514
(58) Field of Classification Search .................. None
See application file for complete search history.

(56) References Cited

U.S. PATENT DOCUMENTS

| 5,258,239 | A | * | 11/1993 | Kobayashi | 429/27 |
| 5,856,035 | A | * | 1/1999 | Khandkar et al. | 429/32 |
| 6,127,058 | A | * | 10/2000 | Pratt et al. | 429/30 |
| 6,475,658 | B1 | | 11/2002 | Pedicini et al. | |

(Continued)

FOREIGN PATENT DOCUMENTS

JP   62-237100   10/1987

(Continued)

OTHER PUBLICATIONS

Online translation of JP 07-249419, Goto et al., Sep. 26, 1995.*

(Continued)

*Primary Examiner* — Barbara Gilliam
*Assistant Examiner* — Kwang Han
(74) *Attorney, Agent, or Firm* — K&L Gates LLP

(57) ABSTRACT

Fuel cell separation, fuel cell device, and electronic applied device technical field are provided. A fuel cell separator capable of making a fuel cell device compact and reducing variations in air supply amount to generating cells. Oscillating fans as fluid oxidant supplying means are respectively provided at openings of channels. The oscillating fans are individually driven to respectively supply air into the channels. The oscillating fans are included in a separator body of a separator. As compared with the case that the oscillating fans are provided separately from a fuel cell body having the separator as a component, the limitation to layout of the fuel cell body and various units for effecting stable electric power generation in the fuel cell body can be reduced, and the fuel cell device can be reduced in size.

14 Claims, 7 Drawing Sheets

U.S. PATENT DOCUMENTS 6,500,575 B1 * 12/2002 Shiue et al. .................. 429/27
6,572,995 B2 * 6/2003 Yang et al. .................. 429/26

FOREIGN PATENT DOCUMENTS

| | | |
|---|---|---|
| JP | 06-188008 | 7/1994 |
| JP | 07-249419 | 9/1995 |
| JP | 2000-186699 | 7/2000 |
| JP | 2002-532859 | 10/2002 |
| JP | 2002-352832 | 12/2002 |
| JP | 2003-086207 | 3/2003 |

OTHER PUBLICATIONS

The American Heritage Diction of the English Language, Definiton for "supply", Fourth Edition, 2006, Hougton Mifflin.*

* cited by examiner

COMPACT FUEL CELL SEPARATOR INCORPORATING FLUID OXIDANT SUPPLY MEANS, A FUEL CELL DEVICE AND AN ELECTRONIC APPLIED DEVICE INCORPORATING THE COMPACT FUEL CELL SEPARATOR

CROSS REFERENCE TO RELATED APPLICATION

The present application claims priority to Japanese Patent Document No. P2003-001964 filed on Jan. 8, 2003, the disclosure of which is herein incorporated by reference.

BACKGROUND OF THE INVENTION

The present invention relates to a fuel cell separator, fuel cell device, and electronic applied device, and more particularly to a fuel cell separator, fuel cell device, and electronic applied device wherein the fuel cell device can be reduced in size with almost no limitation to layout of a fuel cell body in the fuel cell device, and air can be smoothly supplied to each generating cell.

A fuel cell is a power generating device including a generating cell for performing electric power generation by the electrochemical reaction of a fluid fuel such as hydrogen gas or methanol and a fluid oxidant such as oxygen contained in air. In the case of a solid polymer type fuel cell, it generally has a structure formed by sandwiching a proton conductor membrane between an oxygen electrode and a fuel electrode. The oxygen electrode is supplied with air containing oxygen, and the fuel electrode is supplied with a fluid fuel. In performing electric power generation in the solid polymer type fuel cell, ions (protons) move in an electrolyte membrane as an ion exchange membrane to react with the oxygen supplied from the oxygen electrode, thereby generating a current, whereas producing water on the oxygen electrode. Such a generating element of the fuel cell is referred to as an MEA (Membrane and Electrode Assembly). By arranging a plurality of MEAs in a plane or arranging a plurality of generating cells each formed by sandwiching an MEA between a pair of separators in a plane, a fuel cell having a planar structure is configured. Alternatively, by stacking a plurality of MEAs or a plurality of generating cells, a fuel cell having a stack structure is configured.

Further, since the product obtained by the electric power generation in the fuel cell is water, the fuel cell has received attention in recent years as a power generating element causing no environmental pollution, and it has recently been tried to use the fuel cell as a driving power source for driving an electric vehicle or a hybrid vehicle in the field of transport vehicles.

Thus, the use of the fuel cell as a driving power source for transport vehicles is greatly expected. Further, the practical use of the fuel cell in a home power supply system is also expected, and various applications of the fuel cell are examined on a small-sized power source or portable electronic equipment such as a notebook personal computer, mobile phone, and PDA (Personal Digital Assistant), utilizing a weight reduction and size reduction of the fuel cell. In such a fuel cell, it is important to stably output a required electric power and to reduce the size to a portable size. Under these circumstances, various technical developments are being made actively.

Of the pair of separators constituting the generating cell, the separator touching the oxygen electrode of the generating element is formed with a fluid oxidant supply channel for supplying a fluid oxidant such as oxygen to the oxygen electrode. The fluid oxidant supply channel has an opening exposed to an end surface of the separator for taking the outside air into the channel to supply it to the oxygen electrode. The fluid oxidant supply channel is formed as a groove extending in the longitudinal direction of the separator so as to be exposed to the opposite ends of the separator. The outside air supplied from one of the openings of the channel is made to flow in the channel, and then discharged from the other opening to the outside of the generating cell. A plurality of fluid oxidant supply channels may be arrayed in the transverse direction of the separator, so as to efficiently supply oxygen to almost all the surface of the oxygen electrode. An air supplying fan is provided along a side surface of the generating cell to collectively supply air to all the fluid oxidant supply channels. For example, in the case that the fuel cell body has a stack structure formed by stacking a plurality of generating cells to generate a required electric power, the air supplying fan is provided separately from the fuel cell body to collectively supply air to all the fluid oxidant supply channels.

However, in the above case that the air supplying fan is provided separately from the fuel cell body, the layout of the fuel cell body is limited by the layout of the air supplying fan. Moreover, since the air supplying fan is provided in a fuel cell device, a size reduction of the fuel cell device itself is difficult.

Further, in the case of dispersively arranging a plurality of fuel cell bodies in electronic equipment to drive various elements mounted in this electronic equipment at required positions, the air supplying fan provided separately from each fuel cell body causes the production of a waste space in the electronic equipment, resulting in the hindrance to size reduction of the electronic equipment to be driven by the electric power generated in each fuel cell body.

Furthermore, there are variations in amount of air to be supplied by the air supplying fan between a central portion and an outer circumferential portion thereof. As a result, there are variations in amount of air to be supplied into the fluid oxidant supply channels between the channels exposed to the central portion of the fan and the channels exposed to the outer circumferential portion of the fan, causing a possibility that the electric power generation by the fuel cell body may become unstable. Particularly, if there are variations in air supply amount among the generating cells forming a stack structure, there is a possibility that the power generation efficiency in a specific one of the generating cells may be lowered.

SUMMARY OF THE INVENTION

According to the present invention, there is provided a fuel cell separator including a separator body adapted to come into contact with a generating element to make electrical continuity to the generating element, thereby forming a generating cell; a fluid oxidant supply channel formed on the separator body to supply a fluid oxidant to the generating element; and fluid oxidant supplying means provided on the separator body for supplying the fluid oxidant into the fluid oxidant supply channel. With this arrangement, a fuel cell device using this fuel cell separator can be reduced in size, and the flexibility of layout of various units provided in the fuel cell device can be increased.

The fluid oxidant supply channel has an opening exposed to one end of the separator body; and the fluid oxidant supplying means is provided at the opening to make a flow of the fluid oxidant in the fluid oxidant supply channel. With this arrangement, the fluid oxidant can be smoothly taken from the outside of a fuel cell body using this fuel cell separator, and the fluid oxidant can be made to sufficiently flow in the fluid oxidant supply channel.

Preferably, the fluid oxidant supply channel includes a plurality of channels formed on the separator body; each of the channels has the opening; and the fluid oxidant supplying means includes a plurality of supplying means respectively provided at the openings of the channels to individually make a flow of the fluid oxidant in the channels. With this arrangement, variations in amount of the fluid oxidant to be supplied to all the channels can be reduced to thereby effect stable electric power generation in the generating cell.

As a modification, the fluid oxidant supply channel includes a plurality of groups of adjacent channels formed on the separator body; each of the groups of adjacent channels has the opening; and the fluid oxidant supplying means includes a plurality of supplying means respectively provided at the openings of the groups of adjacent channels to individually make a flow of the fluid oxidant in the groups of adjacent channels. With this arrangement, variations in amount of the fluid oxidant to be supplied to all the channels can be reduced without respectively providing the supplying means in the channels.

Preferably, the fluid oxidant supplying means includes an oscillating fan having a fin to be oscillated to make a flow of the fluid oxidant and an actuator for driving the fin. With this arrangement, the fluid oxidant can be sufficiently supplied to the fluid oxidant supply channel, and the fluid oxidant supplying means can be reduced in size.

Preferably, the actuator includes a piezoelectric bimorph. With this arrangement, the fluid oxidant supplying means can be reduced in size, and the fluid oxidant can be sufficiently supplied by a minute electric driving power.

As a modification, the actuator has a bimorph structure formed by laminating shape memory alloys. With this arrangement, the fluid oxidant supplying means can be reduced in size, and the fluid oxidant supplying means can be driven without the limitation to electric driving power.

As another modification, the actuator has a bimorph structure formed of materials having different coefficients of thermal expansion. With this arrangement, the fluid oxidant supplying means can be reduced in size, and the fluid oxidant supplying means can be driven without the limitation to electric driving power.

As another modification, the fluid oxidant supplying means includes a diaphragm pump. With this arrangement, the supply amount of the fluid oxidant can be easily increased.

Preferably, the fluid oxidant supply channel is formed inside of the separator body so as to extend along the surface of the separator body coming into contact with the generating element; the opening is elongated in the transverse direction of the separator body; and the fluid oxidant supplying means includes a rotary fan having a rotating shaft extending in the longitudinal direction of the opening. With this arrangement, the fluid oxidant can be uniformly supplied substantially over the fluid oxidant supply channel extending along the surface of the separator body coming into contact with the generating element.

According to the present invention, there is also provided in an embodiment a fuel cell device having a fuel cell body formed by stacking a plurality of generating cells each composed of a generating element and a pair of fuel cell separators, one of the fuel cell separators including a separator body adapted to come into contact with the generating element to make electrical continuity to the generating element; a fluid oxidant supply channel formed on the separator body to supply a fluid oxidant to the generating element; and fluid oxidant supplying means provided on the separator body for supplying the fluid oxidant into the fluid oxidant supply channel; the fluid oxidant supply channel including a plurality of channels each having an opening exposed to one end of the separator body; the fluid oxidant supplying means including a plurality of supplying means respectively provided at the openings of the channels to individually supply the fluid oxidant through the channels to the generating element, thereby performing electric power generation in each generating cell. With this arrangement, the amounts of the fluid oxidant to be supplied to all the generating cells of the fuel cell body having a stack structure can be individually adjusted according to a power generating condition of each generating cell.

According to the present invention, there is also provided an electronic applied device having a board and a plurality of fuel cell bodies provided on the board at required positions, each of the fuel cell bodies having a fuel cell separator and a generating element, the fuel cell separator including a separator body adapted to come into contact with the generating element to make electrical continuity to the generating element; a fluid oxidant supply channel formed on the separator body to supply a fluid oxidant to the generating element; and fluid oxidant supplying means provided on the separator body for supplying the fluid oxidant into the fluid oxidant supply channel; the fluid oxidant supply channel including a plurality of channels formed on the separator body; the fluid oxidant supplying means including a plurality of supplying means for individually supplying the fluid oxidant to the channels; electric power generated from the plurality of fuel cell bodies being supplied to various elements provided on the board. With this arrangement, the electric power can be supplied to the elements located at the required positions on the board, and the electronic applied device can be reduced in size.

The present invention provides in an embodiment a fuel cell separator, fuel cell device, and electronic applied device wherein the fuel cell device and electronic equipment including a fuel cell body can be reduced in size and variations in amount of the fluid oxidant to be supplied into the fluid oxidant supply channels can also be reduced.

Additional features and advantages of the present invention are described in, and will be apparent from, the following Detailed Description of the Invention and the figures.

DETAILED DESCRIPTION OF THE INVENTION

The fuel cell separator, the fuel cell device, and the electronic applied device according to the present invention will now be described in more detail with reference to the drawings. The fuel cell separator according to the present invention has a separator body adapted to come into contact with a platelike generating element such as an MEA, thereby constituting a generating cell. The fuel cell separator is adapted to be provided on the oxygen electrode side of the generating element, and is formed with a channel for supplying oxygen as a fluid oxidant to the generating element. Air containing the oxygen is supplied from the outside of the generating cell to the channel. Further, a fuel such as hydrogen gas or methanol is supplied to the fuel electrode side of the generating element. Then, the generating element performs electric power generation by using the oxygen as the fluid oxidant and the fuel. The fuel cell separator according to the present invention further has fluid oxidant supplying means for supplying the fluid oxidant to the above-mentioned channel. Accordingly, the fluid oxidant supplying means is not provided separately from the generating cell or a fuel cell body having a stack structure formed by stacking a plurality of generating cells, and the fuel cell body can perform electric power generation.

Some preferred embodiments of the fuel cell separator according to the present invention will now be described in detail with reference to FIGS. 1A to 4B. FIGS. 1A to 4B schematically show the structures of the preferred embodiments of the fuel cell separator.

Figure 1A:
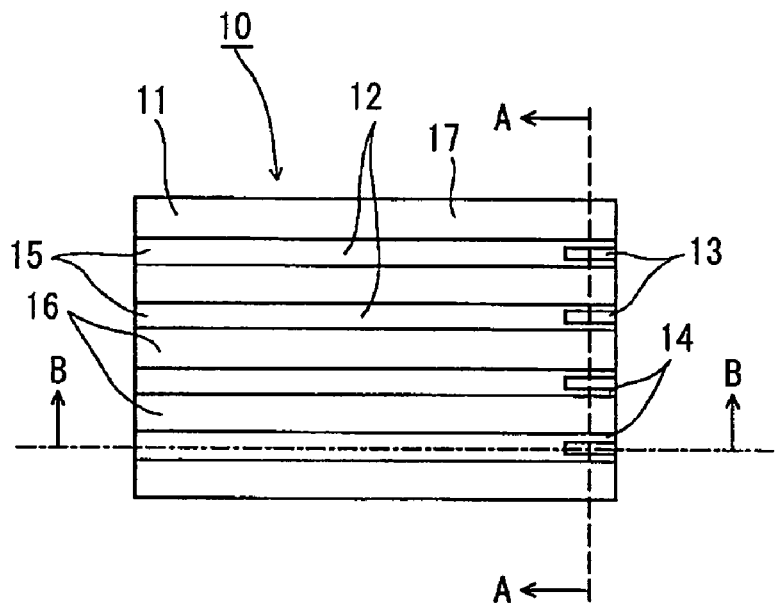
FIG. 1A is a plan view of a fuel cell separator according to a first preferred embodiment of the present invention.
Figure 1B:
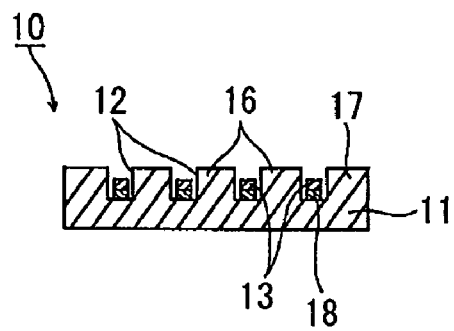
FIG. 1B is a cross section taken along the line A-A in FIG. 1A.
Figure 1C:
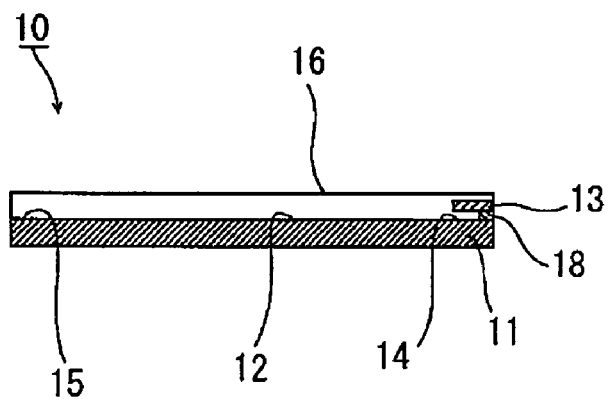
FIG. 1C is a cross section taken along the line B-B in FIG. 1A.

FIGS. 1A to 1C show a separator 10 according to a first preferred embodiment of the present invention. The separator 10 includes a separator body 11 formed with a plurality of (e.g., four as shown) channels 12 for making a flow of air containing oxygen as a fluid oxidant. These channels 12 are respectively provided with a plurality of oscillating fans 13 for individually supplying air into the respective channels 12.

FIG. 1A is a plan view of the separator 10 as viewed from its upper side where the channels 12 of the separator body 11 are exposed. The separator body 11 is adapted to come into contact with a generating element in such a manner that the upper surface of the separator body 11 comes into contact with the oxygen electrode side of the generating element, thereby configuring a generating cell. The channels 12 for supplying the oxygen contained in the air to the generating element are formed on the upper surface of the separator body 11 adapted to come into contact with the oxygen electrode side of the generating element.

Each channel 12 is a groove extending substantially straight from one end (inlet end) to the other end (outlet end) of the separator body 11 in its longitudinal direction. The plural channels 12 are arrayed in the transverse direction of the separator body 11. Each channel 12 has openings 14 and 15 respectively opening to the inlet end and the outlet end of the separator body 11. The air is supplied from the openings 14 into all the channels 12 and discharged from the openings 15 of all the channels 12 to the outside thereof. While the separator 10 includes the separator body 11 adapted to come into contact with the generating element to configure the fuel cell body, the separator 10 may further include a radiation fin extending from the separator body 11 for radiating heat generated during the electric power generation by the fuel cell body.

The oscillating fans 13 are provided as the fluid oxidant supplying means at the openings 14 of the respective channels 12 to individually supply the air into the respective channels 12. Each oscillating fan 13 has a width slightly smaller than the width of each channel 12 and a thickness smaller than the depth of each channel 12. Each oscillating fan 13 may be provided by any air supplying mechanism capable of sufficiently supplying the air into each channel 12. The separator 10 includes the oscillating fans 13 directly mounted on the separator body 11. Accordingly, as compared with the case that the oscillating fans 13 are provided separately from the fuel cell body including the separator 10 as a component, it is possible to reduce the limitation to layout of the fuel cell body and various units for stabilizing the electric power generation by the fuel cell body and it is also possible to reduce the size of a fuel cell device. Further, since the oscillating fans 13 are respectively provided at the openings 14, the air can be taken into the channels 12 from the outside of the fuel cell body, and the air flow in the channels 12 is not hindered.

Each oscillating fan 13 serves as the fluid oxidant supplying means for supplying air into each channel 12. Examples of each oscillating fan 13 include a piezoelectric fan using the oscillation of a piezoelectric element as a drive force, a fan having a bimorph structure obtained by laminating two members formed of shape memory alloys and using a force generated in deformation of these members as a drive force, and a fan having a bimorph structure formed by combining materials having different coefficients of thermal expansion and using a force generated by the change in dimension of the members having the bimorph structure. Further, a pump such as a diaphragm pump may be adopted as the fluid oxidant supplying means to supply air into each channel 12. The fluid oxidant supplying means has such a size that it can be accommodated in each opening 14, so that the fluid oxidant supplying means can be incorporated in the fuel cell body. Accordingly, as compared with the case that the fluid oxidant supplying means such as an air supplying fan is provided separately from the fuel cell body, the fuel cell device can be reduced in size. The fluid oxidant supplying means adoptable in this preferred embodiment is not limited to the above examples, but any means having such a size that can be accommodated in each channel 12 and capable of supplying a required amount of air into each channel 12 may be adopted. Further, a single superfine chip having integrated functions as electronic equipment, such as a micromachine or a MEMS (Micro Electro Mechanical System), may be provided at each opening 14. In this case, a smaller size and higher functionality of the fuel cell device can be realized.

As compared with the case that air is supplied into all the channels 12 collectively by an air supplying fan provided in a fuel cell device separately from the separator 10, the amounts of air to be supplied to the channels 12 can be individually controlled by the oscillating fans 13 respectively provided in the channels 12. Accordingly, variations in air supply amount due to a difference in position among the openings 14 with respect to the air supplying fan can be reduced to thereby allow stable electric power generation.

FIG. 1B is a cross section taken along the line A-A in FIG. 1A. The channels 12 are isolated from each other in the transverse direction of the separator body 11 by a plurality of inner ribs 16 and isolated from the outside of the separator 10 by a pair of outer ribs 17. The upper surfaces of these ribs 16 and 17 are substantially flush with each other, and they are adapted to come into contact with the generating element to form the generating cell, thus configuring the fuel cell body. The channels 12 are spaced apart from each other at substantially equal intervals by the inner ribs 16. Each channel 12 has a substantially rectangular cross section. All the channels 12 are exposed to the upper side of the separator body 11 to supply the air flowing in the channels 12 to the substantially entire surface of the generating element on the oxygen electrode side thereof. While the four channels 12 are formed on the separator body 10 in this preferred embodiment, the number of channels to be formed on the separator body 11 is not limited, but a required number of channels may be formed, wherein each channel has an opening for locating an oscillating fan.

Each oscillating fan 13 has a height smaller than the depth of each channel 12 (each opening 14) and a width smaller than the width of each channel 12 (each opening 14), so that each oscillating fan 13 can be enough accommodated in each opening 14. Accordingly, in the case that the separator 10 is applied to the generating element to configure the generating cell, each oscillating fan 13 does not project from the generating cell. Therefore, in forming a stack structure by stacking a plurality of generating cells each employing the separator 10, each oscillating fan 13 does not hinder the stacking of the plural generating cells. Further, a conventional air supplying fan associated with the stack structure similar to that in the prior art can be eliminated to thereby allow a reduction in size of the fuel cell body. The lower surface of the separator body 11 opposite to the surface where the channels 12 are formed may be formed with channels for making a flow of fluid fuel such as hydrogen gas or methanol. In the case of stacking a plurality of generating cells each employing such a separator having fluid fuel supplying channels, each separator 10 can supply the air containing oxygen as the fluid oxidant to one generating element attached to the upper surface of the corresponding separator body 11 and can also supply hydrogen gas or methanol as the fluid fuel to another generating element attached to the lower surface of the same separator body 11.

FIG. 1C is a cross section taken along the line B-B in FIG. 1A. Each oscillating fan 13 is fixed through a supporting member 18 to the bottom surface of each opening 14 to take the outside air into each channel 12. Any obstacle hindering the flow of air is absent in each channel 12, so that the air supplied into the channels 12 by the oscillating fans 13 is allowed to smoothly flow in the channels 12 and then supplied to the generating element. Thereafter, the air in the channels 12 is discharged from the openings 15.

Figure 2A:
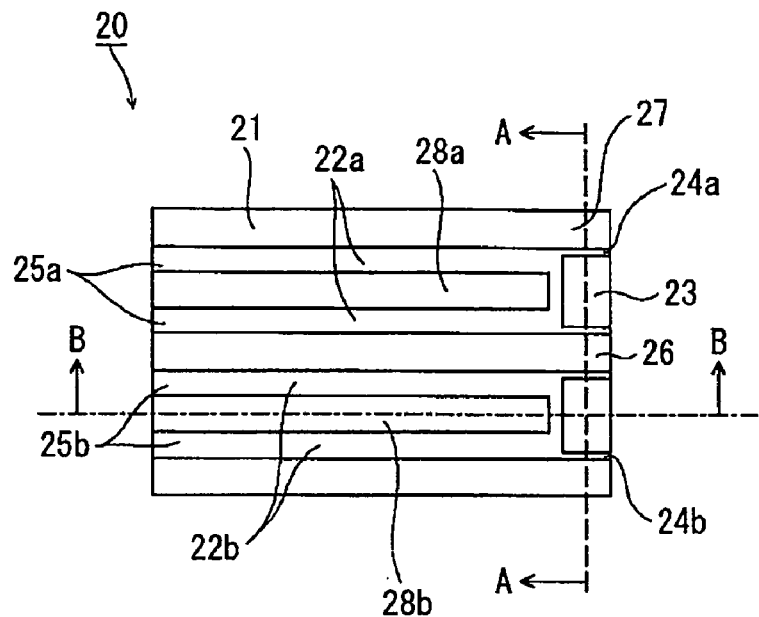
FIG. 2A is a plan view of a fuel cell separator according to a second preferred embodiment of the present invention.
Figure 2B:
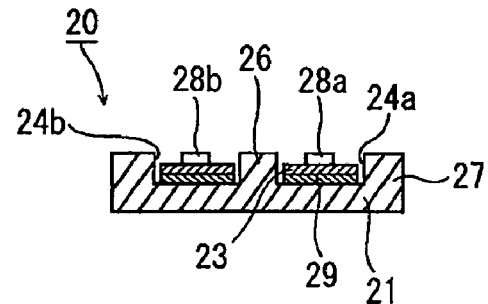
FIG. 2B is a cross section taken along the line A-A in FIG. 2A.
Figure 2C:
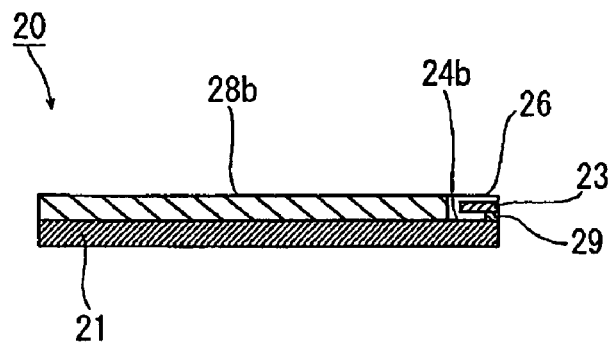
FIG. 2C is a cross section taken along the line B-B in FIG. 2A.

FIGS. 2A to 2C show a separator 20 according to a second preferred embodiment of the present invention. The separator 20 includes a separator body 21 formed with a group of two adjacent channels 22a and another group of two adjacent channels 22b for making a flow of air. The two adjacent channels 22a are joined to each other at a common opening 24a opening to the inlet end of the separator body 21, and the two adjacent channels 22b are also joined to each other at a common opening 24b opening to the inlet end of the separator body 21. Two oscillating fans 23 are respectively provided in the openings 24a and 24b to individually supply air into the respective groups of channels 22a and 22b.

FIG. 2A is a plan view of the separator 20 as viewed from its upper side where the channels 22a and 22b of the separator body 21 are exposed. As described above, the two groups of channels 22a and 22b for supplying oxygen to a generating element are formed on the separator body 21. That is, the separator body 21 has the totally four channels 22a and 22b in this preferred embodiment, wherein the two adjacent channels 22a constitute the first group, and the two adjacent channels 22b constitute the second group. The first group of channels 22a is isolated from the second group of channels 22b by a central rib 26 formed along the transversely central line extending in the longitudinal direction of the separator body 21. That is, the common opening 24a of the two adjacent channels 22a is isolated from the common opening 24b of the two adjacent channels 22b by the central rib 26. The oscillating fans 23 as the fluid oxidant supplying means are respectively provided in the openings 24a and 24b.

All the channels 22a and 22b extend substantially straight from one end (inlet end) to the other end (outlet end) of the separator body 21 in its longitudinal direction. The common opening 24a of the channels 22a opens to the inlet end of the separator body 21, and the common opening 24b of the channels 22b opens to the inlet end of the separator body 21. Further, each channel 22a has an opening 25a opening to the outlet end of the separator body 21, and each channel 22b has an opening 25b opening to the outlet end of the separator body 21. The outside air is supplied from the common opening 24a into the two channels 22a by the oscillating fan 23 provided in the opening 24a, and also supplied from the common opening 24b into the two channels 22b by the oscillating fan 23 provided in the opening 24b. After supplying the air flowing in these channels 22a and 22b to a generating element attached to the separator body 21, the air in the channels 22a and 22b is discharged from the openings 25a and 25b, respectively. Accordingly, as compared with the case that an air supplying fan is provided separately from a generating cell or a fuel cell body having a stack structure formed by stacking a plurality of generating cells to collectively supply air into all the channels, the oscillating fans 23 provided in the openings 24a and 24b can individually control the amounts of air to be supplied to the respective groups of channels 22a and 22b. Accordingly, variations in air supply amount to the channels 22a and 22b can be reduced.

The lower surface of the separator body 21 opposite to the surface where the channels 22a and 22b are formed may be formed with channels for making a flow of fluid fuel such as hydrogen gas or methanol. In the case of stacking a plurality of generating cells each employing such a separator having fluid fuel supplying channels, each separator 20 can supply the air containing oxygen as the fluid oxidant to one generating element attached to the upper surface of the corresponding separator body 21 and can also supply the fluid fuel to another generating element attached to the lower surface of the same separator body 21.

FIG. 2B is a cross section taken along the line A-A in FIG. 2A. As mentioned above, the separator 20 has the central rib 26 for isolating the first group of channels 22a from the second group of channels 22b. The separator 20 further has an inner rib 28a for isolating the two channels 22a from each other except the opening 24a and an inner rib 28b for isolating the two channels 22b from each other except the opening 24b. The separator 20 further has a pair of outer ribs 27 for isolating the channels 22a and 22b from the outside of the separator body 21. The two oscillating fans 23 are fixed through two supporting members 29 to the bottom surfaces of the openings 24a and 24b, respectively.

The upper surfaces of the central rib 26, the inner ribs 28a and 28b, and the outer ribs 27 are substantially flush with each other. Accordingly, in applying the separator 20 to a generating element to configure a generating cell, the upper surfaces of these ribs 26, 28a, 28b, and 27 come into contact with the generating element to thereby provide electrical continuity. Each of the channels 22a and 22b has a substantially rectangular cross section and is exposed to the upper side of the separator body 21, thereby allowing the supply of air containing oxygen to the generating element. Each oscillating fan 23 has a width slightly smaller than the width of each of the openings 24a and 24b and a thickness smaller than the depth of each of the openings 24a and 24b (the depth of each of the channels 22a and 22b). Each oscillating fan 23 may be provided by any air supplying mechanism capable of sufficiently supplying the air into each of the channels 22a and 22b. As mentioned above, the totally four channels 22a and 22b are formed on the separator body 21 in such a manner that the two channels 22a are set in one group and the two channels 22b are set in another group, and the two oscillating fans 23 are individually provided for the respective groups. However, the number of channels to be formed on the separator body 21 is not limited, and the number of channels to be set in each group is not limited.

FIG. 2C is a cross section taken along the line B-B in FIG. 2A. The inner rib 28a extends from the outlet end of the separator body 21 to a position retracted from the inlet end of the separator body 21 by the space of the opening 24a for providing the oscillating fan 23. Similarly, the inner rib 28b extends from the outlet end of the separator body 21 to a position retracted from the inlet end of the separator body 21 by the space of the opening 24b for providing the oscillating fan 23. These oscillating fans 23 are fixed through the respective supporting members 29 to the bottom surfaces of the openings 24a and 24b to supply the outside air into the channels 22a and 22b.

According to the separator 20, the number of oscillating fans 23 can be reduced according to the number of channels as compared with the separator 10 shown in FIGS. 1A to 1C. Accordingly, complication in the step of providing the oscillating fans 23 can be relaxed, and driving power and control circuits in driving the oscillating fans 23 can be reduced. Further, while each oscillating fan 23 is provided to supply air to each group of two channels 22a or 22b in this preferred embodiment, the number of adjacent channels to be set in each group is not limited to two, but each group may be composed of a required number of adjacent channels. Also in this case, each oscillating fan 23 is provided to supply air to each group.

Further, as compared with the case that an air supplying fan is provided in a fuel cell device separately from the fuel cell body including the separator 20 as a component, it is possible to reduce the limitation to layout of the fuel cell body and various units for stabilizing the electric power generation by the fuel cell body and it is also possible to eliminate an extra space for providing the air supplying fan. Accordingly, the fuel cell device can be reduced in size. Furthermore, since the number of oscillating fans 23 can be made smaller than the number of channels 22a and 22b in this preferred embodiment, the separator 20 can be formed in a simple structure and the step of forming the separator 20 can be simplified. Furthermore, since the oscillating fans 23 are respectively provided at the openings 24a and 24b, the air can be taken into the channels 22a and 22b from the outside of the fuel cell body, and the air flow in the channels 22a and 22b is not hindered. In addition, the above-mentioned examples of each oscillating fan 13 shown in FIGS. 1A to 1C may be used as each oscillating fan 23, and any air supplying mechanism having such a size that can be accommodated in each of the openings 24a and 24b and capable of supplying a required amount of air into each of the channels 22a and 22b may be adopted.

Figure 3A:
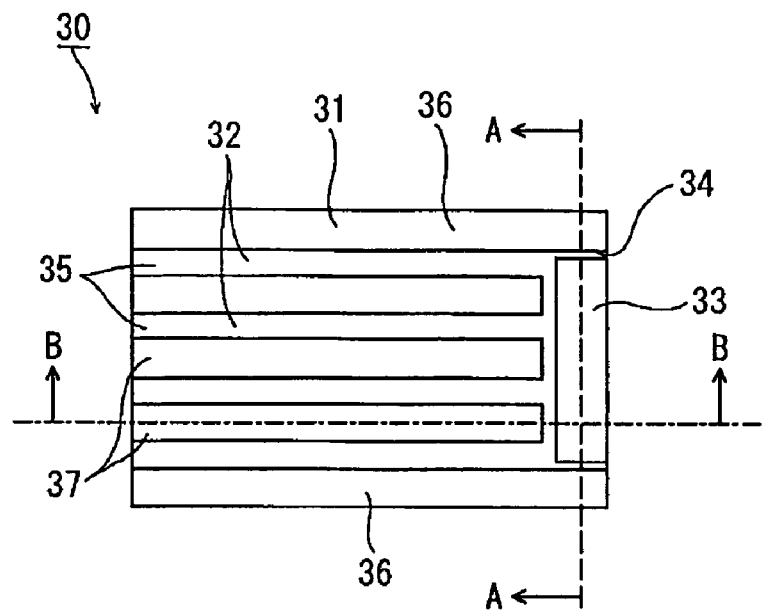
FIG. 3A is a plan view of a fuel cell separator according to a third preferred embodiment of the present invention.
Figure 3B:
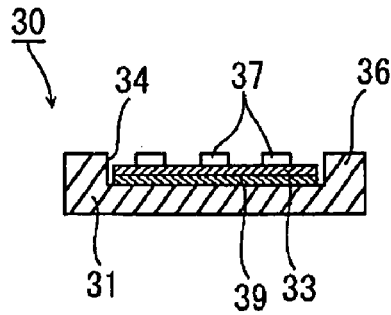
FIG. 3B is a cross section taken along the line A-A in FIG. 3A.
Figure 3C:
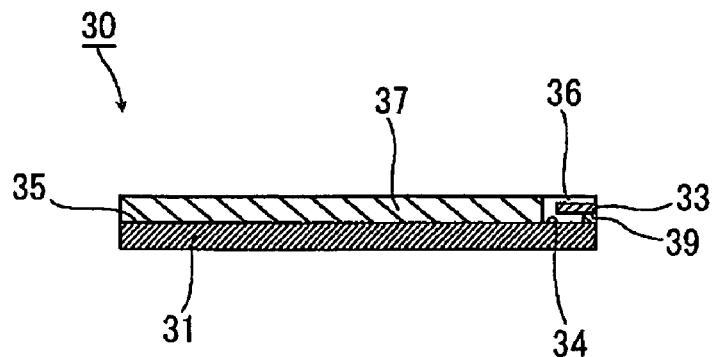
FIG. 3C is a cross section taken along the line B-B in FIG. 3A.

FIGS. 3A to 3C show a separator 30 according to a third preferred embodiment of the present invention. The separator 30 includes a separator body 31 formed with a plurality of (e.g., four as shown) channels 32 for making a flow of air containing oxygen. All of the channels 32 are joined together at a common opening 34 opening to the inlet end of the separator body 31, and an oscillating fan 33 is provided at the common opening 34 to collectively supply the air containing oxygen into all the channels 32. Accordingly, the amounts of air to be supplied to the channels 32 formed on the separator body 31 cannot be individually controlled by the oscillating fan 33. However, as compared with the separator 10 shown in FIGS. 1A to 1C and the separator 20 shown in FIGS. 2A to 2C, the number of oscillating fans can be greatly reduced in this preferred embodiment. Further, in the case of stacking a plurality of generating cells each employing the separator 30 according to this preferred embodiment, the air can be individually supplied to the respective generating cells.

FIG. 3A is a plan view of the separator 30 as viewed from its upper side where the channels 32 of the separator body 31 are exposed. The separator body 31 has the four channels 32 joined together at the common opening 34 opening to the inlet end of the separator body 31. The single oscillating fan 33 is provided in the common opening 34 so as to collectively supply air into all the channels 32.

These channels 32 are a plurality of grooves extending in the longitudinal direction of the separator body 31 and arrayed in the transverse direction of the separator body 31. Each channel 32 has an opening 35 opening to the outlet end of the separator body 31. Air is supplied from the common opening 34 into all the channels 32 by the oscillating fan 33 provided in the common opening 34, and discharged from the openings 35 of the channels 32. The separator 30 has a pair of outer ribs 36 formed along the opposite side edges of the separator body 31 and three inner ribs 37 for isolating the channels 32 from each other at substantially equal intervals in the transverse direction of the separator body 31. Each outer rib 36 extends from the outer end to, the inner end of the separator body 31 in its longitudinal direction, and each inner rib 37 extends from the outer end of the separator body 31 to a position retracted from the inlet end of the separator body 31 by the space of the common opening 34 for providing the oscillating fan 33.

FIG. 3B is a cross section taken along the line A-A in FIG. 3A. All of the outer ribs 36 and the inner ribs 37 have substantially the same height from the bottom surface of each channel 32, that is, the upper surfaces of the outer ribs 36 and the inner ribs 37 are substantially flush with each other. Accordingly, in the case of applying the separator body 31 to a platelike generating element to thereby configure a generating cell, the upper surface of the outer ribs 36 and the inner ribs 37 come into contact with the generating element to provide electrical continuity. The oscillating fan 33 has a width slightly smaller than the width of the opening 34 in the transverse direction of the separator body 31, so that the oscillating fan 33 can collectively supply air into all the channels 32. The oscillating fan 33 is fixed through a supporting member 39 to the bottom surface of the opening 34.

FIG. 3C is a cross section taken along the line B-B in FIG. 3A. As mentioned above, each inner rib 37 extends from the outlet end of the separator body 31 to a position retracted from the inlet end of the separator body 31 by the space of the common opening 34 for providing the oscillating fan 33. Further, the oscillating fan 33 is fixed through the supporting member 39 to the bottom surface of the opening 34 to collectively supply air into all the channels 32.

In this preferred embodiment, the amounts of air to be supplied into the channels 32 cannot be individually controlled per channel or group of adjacent channels. However, air can be individually supplied to a plurality of generating cells each composed of the separator body 31 and the generating element. Accordingly, even in the case that a plurality of generating cells or a plurality of fuel cell bodies each having a stack structure formed by stacking the generating cells are dispersively provided on a board, it is not necessary to individually provide a plurality of air supplying fans as the fluid oxidant supplying means for the respective fuel cell bodies, but a required amount of air can be supplied to each fuel cell body to thereby allow stable electric power generation in each fuel cell body.

Figure 4A:
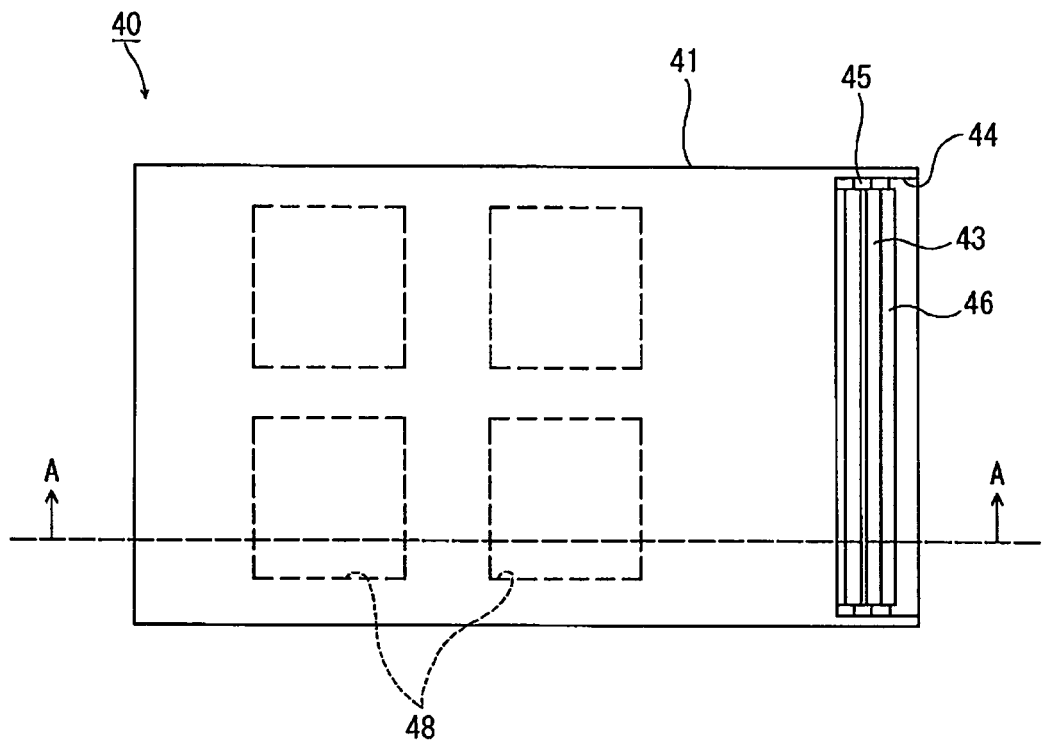
FIG. 4A is a plan view of a fuel cell separator according to a fourth preferred embodiment of the present invention.
Figure 4B:
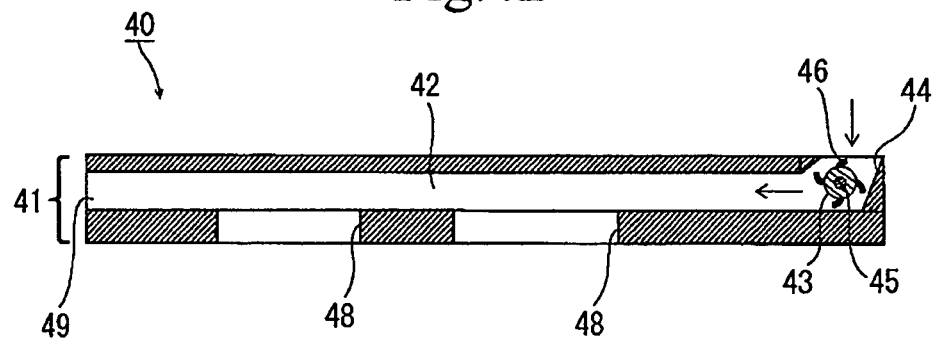
FIG. 4B is a cross section taken along the line A-A in FIG. 4A.

FIGS. 4A and 4B show a separator 40 according to a fourth preferred embodiment of the present invention. FIG. 4A is a plan view of the separator 40 as viewed from its upper side where an opening 44 formed through the upper surface of a separator body 41 is exposed, and FIG. 4B is a cross section taken along the line A-A in FIG. 4A. As shown in FIGS. 4A and 4B, the separator 40 has a wide channel 42 spread almost over the inside of the separator body 41. Further, the separator body 41 is formed with a plurality of (e.g., four as shown) openings 48 opening to the bottom surface of the channel 42 and to the lower surface of the separator body 41. In the case of applying the separator body 41 to a generating element to configure a generating cell, the air supplied from the opening 44 into the channel 42 can be further supplied through the openings 48 to the generating element.

The opening 44 opens to the upper surface of the separator body 41 so as to introduce air into the channel 42. The opening 44 has a substantially rectangular shape as viewed in plan, and it is formed through the upper surface of the separator body 41 at a position near the inlet end thereof. The opening 44 is elongated in the transverse direction of the separator body 41 substantially over the width thereof A rotary fan 43 as the fluid oxidant supplying means for supplying air into the channel 42 is provided in the opening 44, so that the outside air is supplied from the opening 44 into the channel 42 by the rotary fan 43. The outlet end of the separator body 41 opposite to the inlet end thereof is formed with an opening 49 for discharging the air from the channel 42. The rotary fan 43 includes a shaft portion 45 as a rotating shaft rotatably supported to the separator body 41 and extending in the longitudinal direction of the opening 44 (i.e., in the transverse direction of the separator body 41). The rotary fan 43 further includes a plurality of fins 46 formed on the outer circumferential surface of the shaft portion 45 for supplying air into the channel 42. Each fin 46 extends along the shaft portion 45 substantially over the length thereof to substantially uniformly supply air into the whole of the channel 42. The rotary fan 43 has a length substantially equal to the longitudinal size of the opening 44, so that the rotary fan 43 can substantially uniformly supply air from the whole of the opening 44 into the whole of the channel 42.

The channel 42 is a substantially rectangular space defined in the separator body 41 so as to be surrounded by the upper, lower, and side portions thereof. The lower portion of the separator body 41 has the substantially rectangular openings 48 communicating with the channel 42 and the outside of the separator body 41. Accordingly, in the case that the lower surface of the separator body 41 is brought into contact with a generating element to configure a generating cell, the air flowing in the channel 42 can be supplied through the openings 48 to the generating element. After supplying the air to the generating element, the air flowing in the channel 42 is discharged from the opening 49. While each opening 48 has a substantially rectangular shape and the four openings 48 are formed through the lower portion of the separator body 41 in this preferred embodiment, the shape and number of openings 48 are not limited, but a required shape and number of openings 48 may be adopted.

The fins 46 are arranged at substantially equal intervals in the circumferential direction of the shaft portion 45 of the rotary fan 43. The distance between the outer ends of the diametrically opposite ends of the fins 46 with respect to the shaft portion 45 is set slightly smaller than the width of the opening 44, so as to allow the rotation of the rotary fan 43 provided in the opening 44 about the axis of the shaft portion 45. In the separator 40 according to this preferred embodiment, the rotary fan 43 is entirely accommodated in the opening 44 so as not to project from the separator body 41. Accordingly, the separator 40 can be handled as a substantially flat platelike member, so that even when a plurality of generating cells are stacked by applying the separator 40 to a generating element for each generating cell, a stack structure similar to that in the related art can be obtained. Further, in the case of dispersively arranging a plurality of such generating cells in a unit, the generating cells can be arranged on a wiring board at required positions without almost producing a waste space. Further, since the rotary fan 43 as the fluid oxidant supplying means is provided in the separator body 41, no air supplying fan is required separately from a generating cell, but a sufficient amount of air can be supplied to the whole of the channel 42. In the case of applying the separator 40 to a generating element to configure a generating cell, the air containing oxygen is supplied through the separator 40 to the generating element, and a fluid fuel such as hydrogen gas or methanol is supplied to the generating cell, thereby allowing stable electric power generation.

Figure 5:
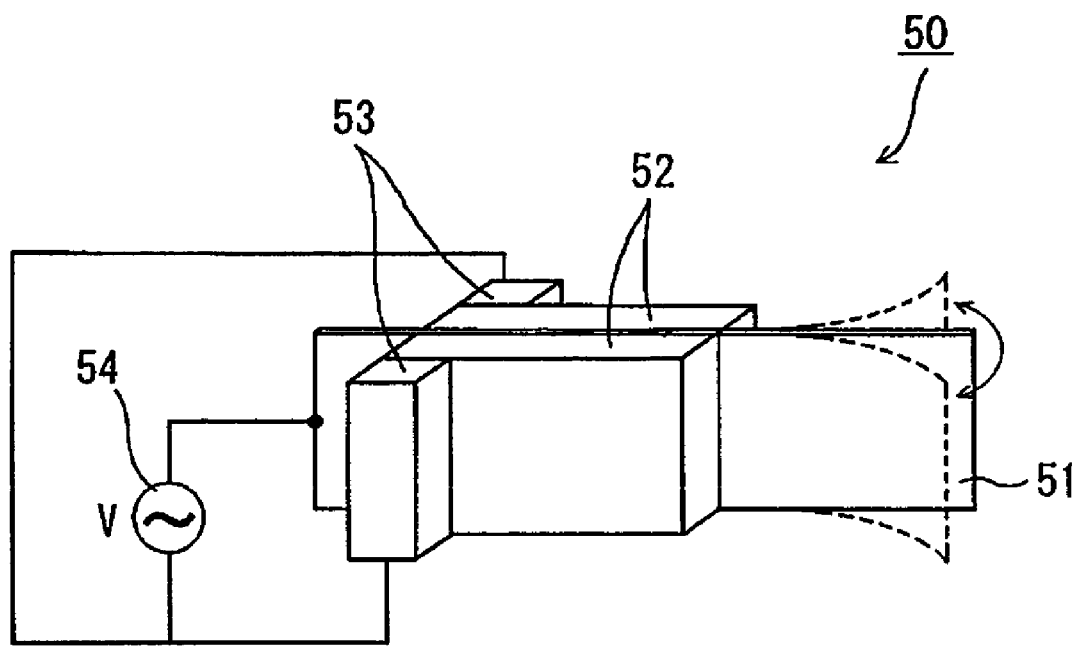
FIG. 5 is a perspective view of a piezoelectric fan as a preferred embodiment of the fluid oxidant supplying means provided in the fuel cell separator according to the present invention.

A preferred embodiment of the oscillating fan usable as the fluid oxidant supplying means will now be described with reference to FIG. 5. The oscillating fan shown in FIG. 5 is a piezoelectric fan 50 having a piezoelectric bimorph type actuator for driving a fin. More specifically, the piezoelectric fan 50 is composed of an oscillating plate 51 as a fin for supplying air, a piezoelectric bimorph 52 consisting of two piezoelectric elements sandwiching the oscillating plate 51, and two contact elements 53 for making electrical connection between the piezoelectric bimorph 52 and a power source 54. The piezoelectric fan 50 is of a cantilever type such that one end portion of the oscillating plate 51 is sandwiched between the two elements of the piezoelectric bimorph 52.

The oscillating plate 51 has a flat oblong shape, and it is sandwiched between the two elements of the piezoelectric bimorph 52 in close contact relationship. The oscillating plate 51 is formed of metal or resin, for example, and the thickness and length of the oscillating plate 51 are selected so that the oscillating plate 51 resonates with the bending vibrations of the piezoelectric bimorph 52. By selecting the thickness and length of the oscillating plate 51 so that it resonates with the bending vibrations of the piezoelectric bimorph 52, the displacement of the front end of the oscillating fan 51 in the direction shown by an arrow in FIG. 5 can be increased to several millimeters to tens of millimeters with a small displacement of hundreds of micrometers obtained by the bending vibrations of the piezoelectric bimorph 52, so that a required amount of air to be supplied can be ensured and the piezoelectric fan 50 can be reduced in size.

The two piezoelectric elements forming the piezoelectric bimorph 52 are platelike members, to which an AC voltage is applied from the power source 54 through the contact elements 53, thereby producing the vibrations of the piezoelectric bimorph 52 to supply a drive force for oscillating the oscillating plate 52. The piezoelectric bimorph 52 is formed of a piezoelectric ceramic such as lead zirconate titanate (PZT).

The piezoelectric fan 50 is simpler in structure than a motor driven fan, and the piezoelectric bimorph 52 can be reduced in size. Further, the piezoelectric fan 50 can be driven stably over a long period of time. Further, the oscillating plate 51 is driven by the bending vibrations of the two piezoelectric elements of the piezoelectric bimorph 52 sandwiching the oscillating plate 51. Accordingly, power consumption can be reduced as compared with that of a motor driven fan. Therefore, even in the case that the piezoelectric fan 50 is provided in the inlet opening of each channel of the fuel cell separator, a sufficient amount of air can be supplied into each channel with such a size that can be accommodated in the inlet opening.

Figure 6:
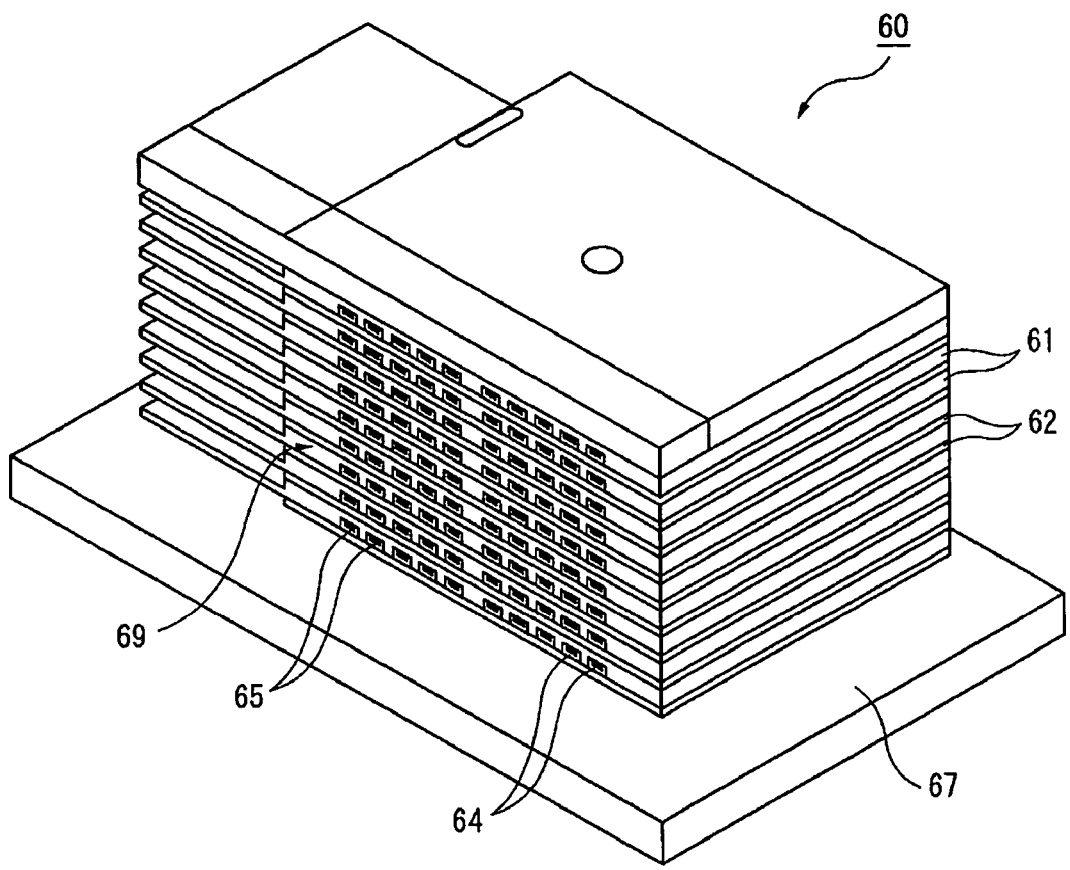
FIG. 6 is a perspective view of a generating unit provided in the fuel cell device according to the present invention.

The fuel cell device of the present invention will now be described. The fuel cell device of the present invention has a generating unit formed by stacking a plurality of generating cells each composed of a generating element and a separator having a structure similar to that of the separator shown in FIGS. 1A to 1C, for example. FIG. 6 is a perspective view showing the structure of such a generating unit 60 adapted to be mounted in the fuel cell device of the present invention. The generating unit 60 has a stack structure formed by alternately stacking a plurality of separators 61 and a plurality of generating elements 62. The generating unit 60 is mounted on a base 67 forming a bottom portion of the fuel cell device.

The generating unit 60 serving as a fuel cell body has a side surface 69 to which a plurality of openings 64 of each separator 61 are exposed. Each separator 61 has a separator body touching the adjacent generating elements 62 on both sides. The separator body is formed with a plurality of channels (not shown) for supplying air to the corresponding generating element 62. Each channel has two openings at its opposite ends (one of the two openings is the opening 64, and the other is not shown). An oscillating fan 65 as the fluid oxidant supplying means is provided in each opening 64 exposed to the side surface 69 of the generating unit 60, so as to supply air into the corresponding channel. Accordingly, an air supplying fan as the fluid oxidant supplying means is not required to be provided separately from the generating unit 60, but the air containing oxygen can be supplied from each opening 64 through the channel of the corresponding separator body to the corresponding generating element by the corresponding oscillating fan 65. Further, as compared with the case that an air supplying fan is provided separately from the generating unit 60 to collectively supply air to all the openings 64, it is unnecessary to ensure a space for installing the air supplying fan. As a result, the fuel cell device can be reduced in size, and the flexibility of layout of various units to be provided in the fuel cell device can be increased.

Further, as compared with the case that an air supplying fan is provided separately from the generating unit 60 to collectively supply air to all the openings 64, variations in amount of air to be supplied from the openings 64 can be reduced to thereby allow stable electric power generation in the whole of the generating unit 60. In particular, in the case that the oscillating fan 65 is provided in each opening 64 as shown in FIG. 6, variations in air supply amount both in the longitudinal direction of the generating unit 60 and in the stacking direction of the generating cells can be reduced. While the separator 10 shown in FIGS. 1A to 1C is used in the generating unit 60 in this preferred embodiment, the separator 20 shown in FIGS. 2A to 2C may be used to configure the generating unit 60. In this case, not only variations in air supply amount among the channels can be reduced, but also the oscillating fans 65 can be reduced in number. Further, in the case that the separator 30 shown in FIGS. 3A to 3C is used to configure the generating unit 60, the oscillating fans 65 can be more reduced in number as compared with the case of using the separator 10 shown in FIGS. 1A to 1C or the separator 20 shown in FIGS. 2A to 2C, and variations in air supply amount in the stacking direction of the generating cells can be reduced.

Although not shown, there are provided around the generating unit 60 various units for effecting stable electric power generation in the generating unit 60, such as a fuel gas supply unit for supplying a fuel gas such as hydrogen gas to the generating elements 62 and a pressure control unit for controlling a gas pressure of the fuel gas. Since it is unnecessary to ensure a space for installing an air supplying fan as the fluid oxidant supplying means for supplying air to the generating unit 60, the flexibility of layout of these units can be increased and the fuel cell device can be reduced in size.

Figure 7:
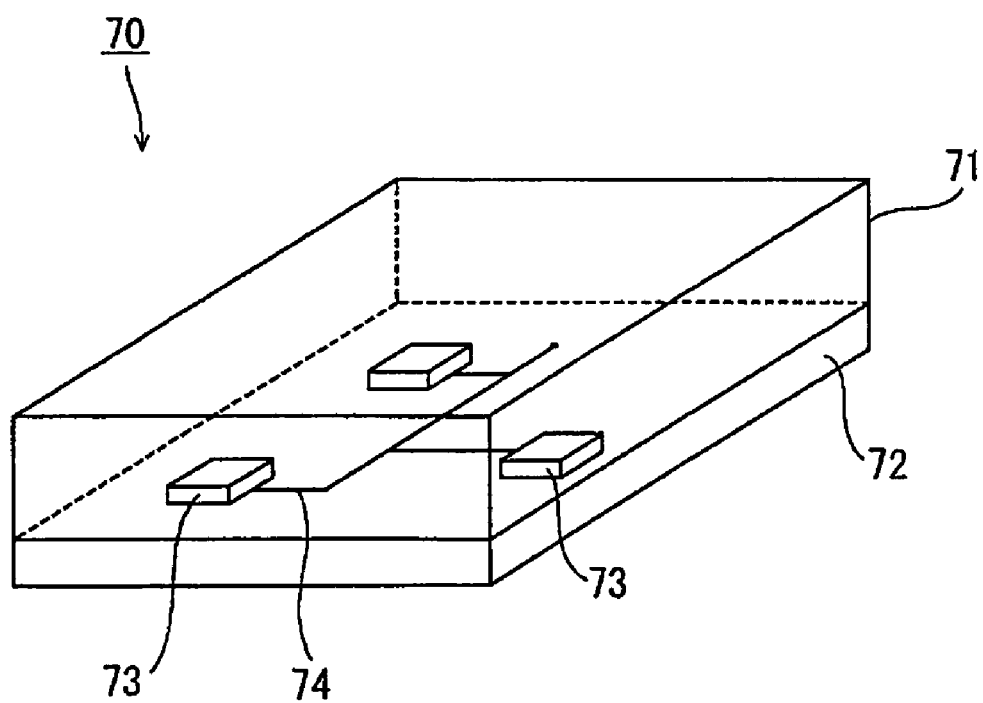
FIG. 7 is a schematic perspective view of the electronic applied device according to the present invention.

The electronic applied device according to the present invention will now be described with reference to FIG. 7. FIG. 7 is a schematic perspective view of an electronic applied device 70 including a plurality of generating units 73. The electronic applied device 70 further includes a wiring board 72 and a housing 71. The generating units 73 are dispersively provided at required positions on the wiring board 72, and various other units (not shown) are also mounted on the wiring board 72. These generating units 73 and various other units mounted on the wiring board 72 are enclosed by the housing 71.

Each generating unit 73 has a generating cell composed of a generating element and any one of the separators 10 to 40 shown in FIGS. 1A to 4B or a stack structure formed by stacking a plurality of generating cells each employing any one of the separators 10 to 40 shown in FIGS. 1A to 4B. Accordingly, each generating unit 73 includes at least one oscillating fan as the fluid oxidant supplying means for supplying the outside air to each generating unit 73. In other words, the separator as a component of each generating unit 73 includes at least one oscillating fan or rotary fan for supplying air through the channel or channels of the separator to the generating element, so that all the generating units 73 can individually take the outside air. Further, a fluid fuel such as hydrogen gas or methanol is collectively supplied through a fluid fuel supply line 74 to all the generating units 73. Thus, an air supplying fan as the fluid oxidant supplying means is not required to be provided separately from each generating unit 73, but each generating unit 73 can perform electric power generation. According to the electronic applied device 70 in this preferred embodiment, the generating units 73 can be dispersively arranged at required positions in the electronic applied device 70, thereby reducing power loss due to wiring and design limitation. Further, by locating a generating unit in association with an element having high power consumption, electrical circuit design can be optimized electrically or thermally. Further, the flexibility of layout of various units and elements in the electronic applied device 70 can be increased, and the electronic applied device 70 can be reduced in size.

According to the fuel cell separator of the present invention, the limitation to layout of the generating unit provided in the fuel cell device can be relaxed, and the fuel cell device can be reduced in size. Further, also in the electronic applied device according to the present invention including the generating units for supplying electric power for driving various units, the flexibility of layout of the various units in the electronic applied device can be increased and the electronic applied device can be reduced in size. Further, the generating units may be dispersively arranged in the electronic applied device rather than using an air supplying fan as the fluid oxidant supplying means for collectively supplying air to all the generating units. Accordingly, various units mounted in the electronic applied device can be directly supplied with electric power from the generating units adjacent to the various units.

In the fuel cell device according to the present invention, the stacked generating cells are individually supplied with air to thereby reduce variations in air supply amount among the generating cells and also reduce variations in air supply amount in each generating cell. Accordingly, electric power generation can be stably performed. Further, a single superfine chip having integrated functions as electronic equipment, such as a micromachine or a MEMS (Micro Electro Mechanical System), may be provided at each inlet opening. In this case, a smaller size and higher functionality of the fuel cell device can be realized.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A fuel cell separator comprising:
a separator body adapted to contact with a generating element to create electrical continuity to said generating element, thereby forming a generating cell, wherein the generating element is a MEA adapted to receive hydrogen gas or methanol as fuel;
a fluid oxidant supply channel formed on said separator body to supply a fluid oxidant to said generating element; and
at least one element selected from the group consisting of a fan and a pump provided within said separator body for supplying said fluid oxidant into said fluid oxidant supply channel,
wherein the element selected from the group consisting of a fan and a pump is provided at an opening on an inlet end of the fluid oxidant supply channel.

2. The fuel cell separator according to claim 1, wherein:
said fluid oxidant supply channel comprises a plurality of channels formed on said separator body;
each of said channels has said opening; and
said element selected from the group consisting of a fan and a pump comprises a plurality of supplying means respectively provided at said openings of said channels to individually make a flow of said fluid oxidant in said channels.

3. The fuel cell separator according to claim 1, wherein:
said fluid oxidant supply channel comprises a plurality of groups of adjacent channels formed on said separator body;
each of said groups of adjacent channels has said opening; and
said element selected from the group consisting of a fan and a pump comprises a plurality of supplying means respectively provided at said openings of said groups of adjacent channels to individually provide a flow of said fluid oxidant in said groups of adjacent channels.

4. The fuel cell separator according to claim 1, wherein said element selected from the group consisting of a fan and a pump comprises an oscillating fan having a fin to be oscillated to provide a flow of said fluid oxidant and an actuator for driving said fin.

5. The fuel cell separator according to claim 4, wherein said actuator comprises a piezoelectric bimorph.

6. The fuel cell separator according to claim 4, wherein said actuator has a bimorph structure formed by laminating shape memory alloys.

7. The fuel cell separator according to claim 4, wherein said actuator has a bimorph structure formed of materials having different coefficients of thermal expansion.

8. The fuel cell separator according to claim 1, wherein said element selected from the group consisting of a fan and a pump comprises a diaphragm pump.

9. The fuel cell separator according to claim 1, wherein:
said fluid oxidant supply channel is formed inside of said separator body so as to extend along the surface of said separator body coming into contact with said generating element;
said opening is elongated in the transverse direction of said separator body; and
said element selected from the group consisting of a fan and a pump comprises a rotary fan having a rotating shaft extending in the longitudinal direction of said opening.

10. The fuel cell separator according to claim 1, wherein said element selected from the group consisting of a fan and a pump has a height smaller than a depth of said fluid oxidant supply channel.

11. A fuel cell device having a fuel cell body formed by stacking a plurality of generating cells each composed of a generating element and a pair of fuel cell separators, one of said fuel cell separators comprising:
a separator body adapted to contact with said generating element to make electrical continuity to said generating element, wherein the generating element is a MEA adapted to receive hydrogen gas or methanol as fuel;
a fluid oxidant supply channel formed on said separator body to supply a fluid oxidant to said generating element; and
an element selected from the group consisting of a fan and a pump provided within said separator body for supplying said fluid oxidant into said fluid oxidant supply channel, wherein said fluid oxidant supply channel comprises a plurality of channels each having an opening exposed to one end of said separator body, and wherein said element selected from the group consisting of a fan and a pump comprises a plurality of elements respectively provided at said openings of said channels to individually supply said fluid oxidant through said channels to said generating element, thereby performing electric power generation in each generating cell,
wherein the element selected from the group consisting of a fan and a pump is provided at an opening on an inlet end of the fluid oxidant supply channel.

12. The fuel cell device according to claim 11, wherein said element selected from the group consisting of a fan and a pump has a height smaller than a depth of said fluid oxidant supply channel.

13. An electronic applied device having a board and a plurality of fuel cell bodies provided on said board at required positions, each of said fuel cell bodies having a fuel cell separator and a generating element, said fuel cell separator comprising:
a separator body adapted to contact with said generating element to make electrical continuity to said generating element, wherein the generating element is a MEA adapted to receive hydrogen gas or methanol as fuel;
a fluid oxidant supply channel formed on said separator body to supply a fluid oxidant to said generating element; and an element selected from the group consisting of a fan and a pump provided within said separator body for supplying said fluid oxidant into said fluid oxidant supply channel, wherein said fluid oxidant supply channel comprises a plurality of channels formed on said separator body, wherein said an element selected from the group consisting of a fan and a pump comprises a plurality of elements for individually supplying said fluid oxidant to said channels, and wherein electric power generated from said plurality of fuel cell bodies is supplied to various elements provided on said board, wherein the element selected from the group consisting of a fan and a pump is provided at an opening on an inlet end of the fluid oxidant supply channel.

14. The electronic applied device according to claim 13, wherein said element selected from the group consisting of a fan and a pump has a height smaller than a depth of said fluid oxidant supply channel.

* * * * *